Figure 1:
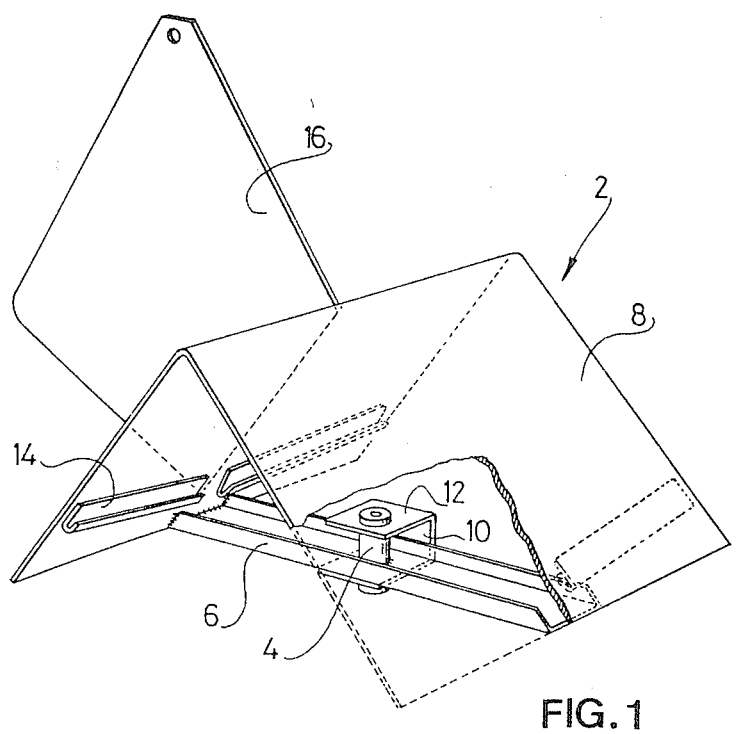

United States Patent [19]

Lindquist

[11] Patent Number: 4,487,112
[45] Date of Patent: Dec. 11, 1984

[54] CHIMNEY TURNCAP

[76] Inventor: Finn Lindquist, Raagevej 21, Jägerspris, Denmark

[21] Appl. No.: 432,906
[22] PCT Filed: Jan. 26, 1982
[86] PCT No.: PCT/DK82/00005
 § 371 Date: Sep. 28, 1982
 § 102(e) Date: Sep. 28, 1982
[87] PCT Pub. No.: WO82/02586
 PCT Pub. Date: Aug. 5, 1982

[51] Int. Cl.³ .............................................. F23L 17/02
[52] U.S. Cl. ........................................ 98/71; 98/66 R; 98/67
[58] Field of Search ................. 98/66 R, 67, 68, 71, 98/76, 122; 110/128

[56] References Cited

U.S. PATENT DOCUMENTS

| 439,494 | 10/1890 | Eurich | 98/68 |
| 720,210 | 2/1903 | Wunderlich | 98/67 |
| 846,446 | 3/1907 | Ball | 98/71 |
| 1,626,002 | 4/1927 | Lobit | 98/66 R |
| 2,766,678 | 10/1956 | Morris | 98/67 |

FOREIGN PATENT DOCUMENTS

| 17056 | of 1909 | United Kingdom | 98/66 R |
| 14171 | of 1910 | United Kingdom | 98/71 |

Primary Examiner—Harold Joyce
Attorney, Agent, or Firm—Antonelli, Terry & Wands

[57] ABSTRACT

A chimney turncap is provided with interior lower drains (14) for guiding condensed water to a collector tray (6) located in the warm zone of the chimney top, whereby the water disappears by evaporation. The hood portion (8) is a semitubular element having a vane (16) placed so as to make the hood assume a position transversely to the wind, whereby the smoke leaves the hood crosswise through the opposite open ends thereof; in this manner the space underneath the hood member is shielded from the direct influence of the wind, such that sufficient heat can be retained for said evaporation. For the same purpose the hood even acts as a reflector for heat radiation from the chimney.

5 Claims, 4 Drawing Figures

U.S. Patent   Dec. 11, 1984   Sheet 1 of 2   4,487,112

CHIMNEY TURNCAP

This invention relates to a chimney turncap and, more particularly, to a chimney turncap which includes a hood member provided with vane means for enabling an automatic adjusting of the hood member in accordance with a direction of the wind so as to provide for a simple self-adjusting turncap serving to prevent rain from falling into the chimney. Such turncaps are well known and are very old in the art, and several types are even claimed to produce additional advantages with respect to the chimney draught and other parameters and phenomena. It is a general problem, however, that the humid smoke gas produces a considerable amount of water condensation on the inside of the hood member, and the water dripping down from the hood causes more than one type of damage to the chimney. In some known turncap designs guide means are provided for draining off the water at some circumferential point of the turncap, whereby the water may be held away from the chimney tube, but the resulting discharge of sooty water along the outside of the chimney obviously shows its own type of disadvantage.

It is the purpose of the invention to provide a chimney turncap structure which eliminates the above mentioned problems of the condensed water which may flow down either into the chimney tube or along the outside of the chimney.

The invention is based on the cognition that in usual firing and chimney systems the top area of the chimney and therewith the turncap structure itself receives not only a flow of humid smoke gas, but also a considerable amount of heat energy from the smoke gas and from the underlying heated portions of the chimney, and that the heat energy hereby available at the top of the chimney is more than enough for causing the condensed water to evaporates, when care is taken to cause the water to be collected in a water collector, located so as to be pronounced, subjected to the heat adjacent the top end of the chimney.

In accordance with advantageous features of the present invention, a chimney turncap is provided which includes a hood member having vane means so as to enable a positioning thereof in accordance with the wind direction. The hood member generally covers the chimney opening so as to receive smoke therefrom and to cause the smoke to be horizontally diverted through a lateral opening in the hood. Guide means are provided inside of the hood for guiding condensed water from an inner surface of the hood down to a water outlet. A water collector communicates with the water outlet and is mounted in a warm top zone of the chimney in such a manner that the condensed water, continually supplied into the water collector, is evaporated therefrom by a natural heat of the chimney and the smoke gas without the water overflowing the water collector.

The hood member should be designed so as to promote the heating of the water collector rather than immediately letting away the heat with the wind. In order to obtain this it is a outstanding additional feature of the invention that the hood member may be designed as a semitubular shell member having an upwardly converging cross section and having its said vane means located in such a manner that the natural position of the hood member is crosswise to the wind direction, i.e. such that the hood is closed both windwardly and leewardly as well as upwardly, but open at both opposed ends of the transversely oriented semitubular shell member. This design, as more fully explained below, has proved to be very advantageous in several respects, also with respect to both the primary purpose of the turncap and the accumulation of the heat energy as necessary for evaporating the condensed water.

In a preferred embodiment the cross section of the semitubular hood is as an inverted V, whereby the condensed water may flow down along the inner sides without dripping down therefrom, and the water is easily collectable by lower drain means communicating with the said water collector.

The water collector is preferably rigidly associated with the hood itself, e.g. shaped as a narrow tray transversely interconnecting the middle portions of the opposed lower edges of the side walls of the semitubular hood, whereby the tray will project diagonally across the chimney opening and thus even be able to form a construction element comprising a central rotation pin or socket for cooperation with a countersocket or pin, respectively, of a stationary carrier structure mounted in connection with the chimney. The collector tray will thus cross the chimney opening, whereby it will be subjected to the heat of the smoke gas and additionally receive radiation heat from the chimney and reflected radiation heat from the hood member.

Figure 2:
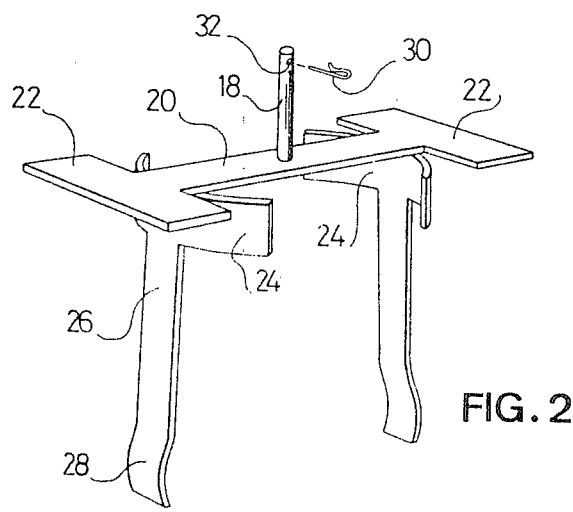
Figure 3:
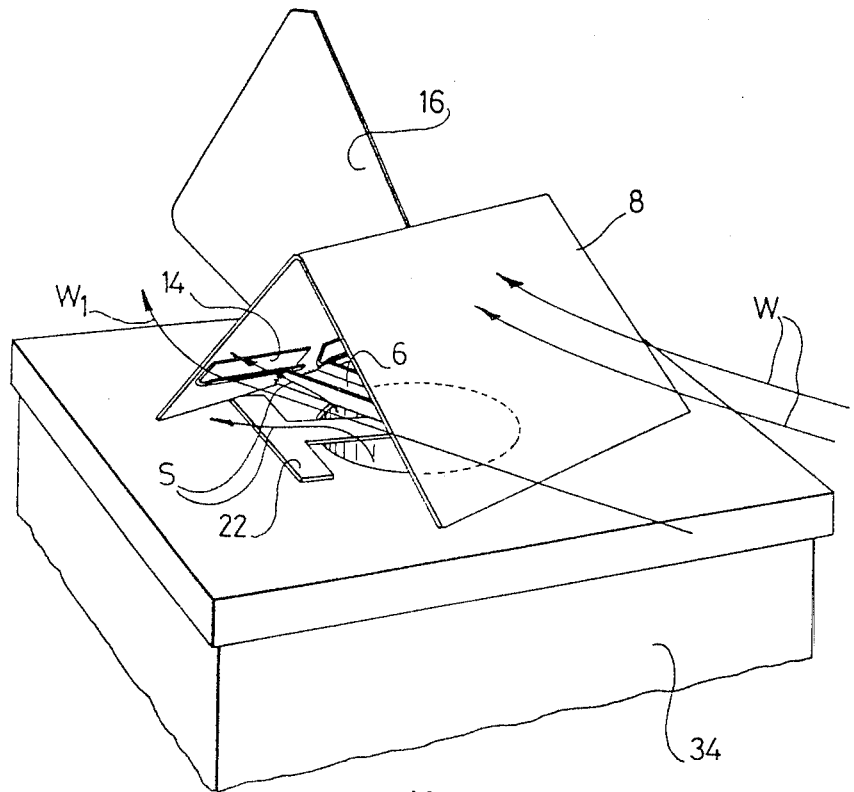
Figure 4:
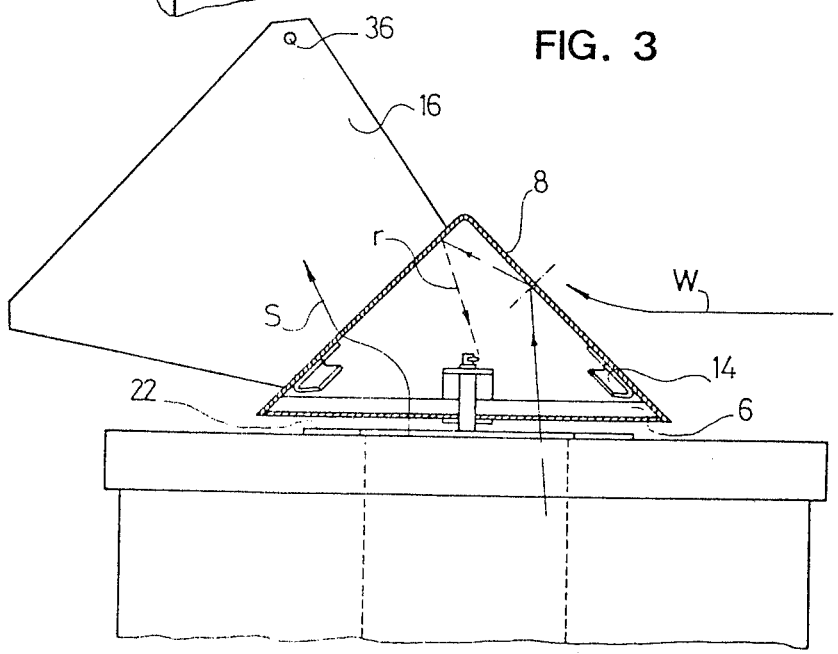

In the following the invention is described in more detail with reference to the accompanying drawing, in which:

FIG. 1 is a perspective view of the hood member of a turncap according to the invention, FIG. 2 is a corresponding view of a carrier structure therefor, FIG. 3 is a perspective view of the assembled turncap structure as mounted topwise on a chimney, and FIG. 4 is a sectional view of the hood member.

As shown in FIG. 1, a hood member generally designated by the reference numeral 2 comprises a lower central vertical bushing 4 adapted to be engaged by a carrier pin of a stationary carrier structure such that the hood member will be freely rotatable about the axis of the bushing 4. The bushing 4 is rigidly connected with the bottom portion of an elongate narrow tray member 6, the opposed ends of which are secured, by welding or otherwise, to respective lower middle portions of the opposed side walls of a hood portion 8 constituted by a sheet metal member profiled with inverted V-shape, with a top angle preferably being approximately 90°. For stabilizing the bushing 4 relative the tray 6 there is provided a bracket member 10 secured by welding or otherwise to a wide area of the underside of the tray bottom and having a top portion 12 associated with an upper end portion of the bushing 4.

Adjacent the lower edges of the opposed inner walls of the hood portion 8 are mounted straightlined water drain members 14 in such inclined positions that water flowing down the walls run into the drain members and along these to their lower ends, which are located just above the respective ends of the tray member 6, i.e. the water is collected in the tray member.

The hood portion 8 has a vane 16, which is a plate member mounted on one side of the hood 8 generally in the vertical cross middle plane thereof.

As shown in FIG. 2 a support structure for the hood member 2 comprises a central vertical pin 18 which projects upwardly from a carrier plate 20 having opposed widened end portions 22. Just inside these end portions there is secured to the underside of the carrier plate 20 a pair of opposed, arched collar members 24 shaped and located so as to at least roughly fit into the top opening of a chimney. The collar members 24 are each provided with a downwardly projecting leg member 26 having a lower outwardly arched portion 28. In their natural positions the leg members 26 are slightly diverging downwardly, but they are resilient such that they will clamp against the opposed sides of the chimney tube when the support structure is mounted topwise on the chimney with the end portions 22 of the member 20 rested against the top side of the chimney. Normally it will not be necessary to secure the structure to the chimney by further fastening means.

The hood member 2 is mounted on the pin 18 by its bushing 4, and it may be anchored thereto, freely rotatable, by means of a cross pin 30 inserted through a top cross hole 32 in the pin 18 just above the top end of the mounted bushing 4. If desired a rotation bearing (not shown) may be placed between the lower end of the bushing 4 and the top side of the support plate 20.

The assembled turncap as mounted on a chimney 34 is shown in FIGS. 3 and 4. It will be readily understood that the vane 16 will operate to constantly maintain the hood portion 8 oriented crosswise to the wind direction, as indicated by the arrow w, whereby the smoke s from the chimney opening will have to leave the hood portion 8 through the opposed open lateral ends thereof. Though a certain suction action may be created by the wind passing across these open ends the resulting suction effect will be moderate, and the warm smoke gas will not instantaneously be swept away from the space inside the hood portion 8. The warm smoke or flue gas, therefore, gets the opportunity to cause the diagonal tray member 6 and its contents to be heated, and there is reason to believe that even an amount of radiation heat from the chimney will contribute to the heating of the tray 6 both directly and by way of heat radiation r as reflected by the inner surfaces of the hood portion 8. In order to amplify the latter effect the hood portion 8 may be made of a material such as aluminium coated steel plate which shows good radiation reflection properties in addition to being corrosion resistant.

In practice the tray 6 will normally be easily heatable to such an extent that the condensed water as continuously collected therein from the drain members 14 will be evaporated without overflowing the tray, whereby all problems as to the downlet of the condensed water are simply eliminated. Of course, the water as present in the tray may contain some soot or other impurities, but in practice the turncap may operate during a very long time without the tray being filled up by solid precipitations, while on the other hand a very minor amount of soot would be able to substantially miscolour the outside of the chimney if the water was caused to flow down from the hood member. A downflow through the chimney tube itself would be highly unrecommendable for various well known reasons.

The pronounced inverted V-shape of the hood portion 8 is advantageous in that the water as condensed on the inside thereof will seek down along the inner hood surfaces without dripping down therefrom. Another advantage seems to be that the smoke gas as leaving the hood portion through the open ends thereof tends to be deflected upwardly, as shown by the arrow s in FIG. 4 and the wind arrow w, in FIG. 3, because the wind will create a sub-pressure on the leeward outside of the hood portion, whereby the pressure gradient across the downstream end edges of the hood portion will be rearwardly and upwardly directed. Thus, the smoke will tend to leave the turncap with an upwardly directed flow component as generally highly desirable.

Thus, the particular design of the hood portion 8 accounts for certain pronounced advantages, and it will be noted that the design is nevertheless extremely simple. The design of the hood portion even conditions a very simple design of the drain means 14 and 6 for the condensed water. The drain members 14 could be embodied by lowermost bent edge portions of the plate material of the hood portion 8 itself, but because the drain members should be inclined inwardly a possible resulting disadvantage would be that the opposed ends of the hood portion 8 would have their undersides spaced above the top of the chimney to such an extent that the wind could sweep across the very top surface of the chimney adjacent or underneath the ends of the hood portion 8, whereby the heat retaining effect of the hood portion would be reduced.

It will be within the scope of the invention to provide a water collector (6) in rigid association with the carrier structure (FIG. 2) rather than with the rotary hood member 2, in which case, of course, the collector should be shaped so as to be able to receive the condensed water as drained off from the hood 2 irrespectively of the angular position of the hood member. Such a stationary collector, therefore, could comprise a tray portion located either centrally underneath the pin 18 or as an annular member arranged concentrically with this pin and cooperating with an excentrically arranged downlet opening of a water collector system of the hood member 2. In both or other cases the evaporator tray should of course be located and designed such that it does not cause any blocking of the free outlet of smoke gas from the top of the chimney.

As mentioned, the transverse orientation of the hood portion 8 seems advantageous not only with respect to the accumulation of the heat for evaporating the condensed water, but even for the operation conditions of the furnace or firing place. Thus, a reduced tendency to occurance of return smoke has been noted, and the effect of the hood may be changed or adjusted to specific circumstances by another design of e.g. the side openings of the hood portion; in the embodiment shown these openings are defined by edges located in a common plane which is orthogonal to the longitudinal direction of the hood portion, but the opening plane may well be oblique, e.g. upwardly and outwardly and/or rearwardly and inwardly. Besides, the opening planes would of course not need to be planar, and even the length of the hood portion and its length/width ratio may be selected for optimal operation.

In practice a symmetrical standard hood portion having a height of 15 cm and a length and a width of 28 cm has been found almost universally usable, but it would be possible to provide for means enabling a local adjustment of the geometry and dimensions of the hood portion, including the inclination of both or each of the walls thereof.

The chimney sweeper will have easy access to the chimney, since he can just retract the entire turncap structure from the chimney and remount it when the work has been done. A hole 36 in the top end of the vane 16 is adapted to be engaged by the sweeper's snap hook for safe carrying of the turncap structure during the sweeping work.

It should be mentioned that in a preferred embodiment the bushing 4 is replaced by a drawn up collar portion of the bottom of the tray 6, such that the water cannot leave the tray through the corresponding hole. The collar projects only slightly upwardly, and the pin 18 is received through the said hole and the hole in the top portion 12 of the U-member 10. On the lower end of the pin 18 is placed a washer of stainless steel, and the flat underside of the U-member 10 bears direct on this washer. With the stainless steel engaged by the aluminium coated plate material an almost ideal bearing is obtained in the very aggressive surroundings.

I claim:

1. A chimney turncap comprising a hood member, means for rotatably mounting the hood member on a top side of a chimney so as to be rotatable about a vertical axis, vane means for enabling an automatic adjustment of a position of the hood member in accordance with a wind direction, the hood member generally covering an opening of the chimney so as to enable a ventilation thereof in a horizontal direction through a lateral opening in the hood member, guiding means disposed inside said hood member for guiding condensed water from the inner surface of the hood member to a water outlet, a water collector communicating with the water outlet, said water collector being mounted in a top zone of the chimney in such a manner that the condensed water continually supplied into the water collector is evaporated therefrom without the water overflowing the water collector, water drains are provided on an inside of opposed walls of the hood member along lower edges thereof, the water drains being inclined so as to guide water towards an outlet end communicating with the water collector tray means, said water collector being fashioned as a tray means projecting into a central area of the hood member so as to be located at least partly above the opening of the chimney.

2. A turncap according to claim 1, in which the tray means includes a single tray shaped as a narrow elongate tray mounted between lowermost middle edge portions of the opposed walls of the hood member so as to extend diagonally across the opening of the chimney, said single tray forming a portion of said means for rotatably mounting the hood member.

3. A turncap according to claim 1, in which the water collector is a tray element rigidly associated with the rotatable hood member.

4. A turncap according to claim 1, the hood member includes a generally semi-tubular hood portion which is open at both ends, said vane means being mounted on the hood portion in such a manner that in a natural operative position of the hood member in the wind an axis of the semitubular element is disposed transversely of the wind direction.

5. A turncap according to claim 1, in which the hood portion is a substantially straight plate element of inverted V-shaped cross section.

* * * * *